United States Patent
Tione et al.

(10) Patent No.: US 11,780,414 B2
(45) Date of Patent: Oct. 10, 2023

(54) VEHICLE BRAKING CONTROL SYSTEM

(71) Applicant: Faiveley Transport Italia S.P.A, Turin (IT)

(72) Inventors: Roberto Tione, Turin (IT); Matteo Frea, Turin (IT); Luc Imbert, Turin (IT)

(73) Assignee: FAIVELEY TRANSPORT ITALIA S.P.A, Piossasco (IT)

( * ) Notice: Subject to any disclaimer, the term of this patent is extended or adjusted under 35 U.S.C. 154(b) by 556 days.

(21) Appl. No.: 16/955,396

(22) PCT Filed: Dec. 17, 2018

(86) PCT No.: PCT/IB2018/060169
§ 371 (c)(1),
(2) Date: Jun. 18, 2020

(87) PCT Pub. No.: WO2019/123198
PCT Pub. Date: Jun. 27, 2019

(65) Prior Publication Data
US 2021/0039615 A1  Feb. 11, 2021

(30) Foreign Application Priority Data
Dec. 18, 2017 (IT) .............................. 201700145810

(51) Int. Cl.
*B60T 8/17* (2006.01)
*B60T 8/172* (2006.01)
*B60T 13/66* (2006.01)

(52) U.S. Cl.
CPC ............ *B60T 8/1705* (2013.01); *B60T 8/172* (2013.01); *B60T 13/665* (2013.01);
(Continued)

(58) Field of Classification Search
CPC ...... B60T 8/1705; B60T 8/172; B60T 13/665; B60T 13/662; B60T 2210/12;
(Continued)

(56) References Cited

U.S. PATENT DOCUMENTS

| 8,744,652 B1 | 6/2014 | Nishinaga et al. |
| 2007/0001629 A1* | 1/2007 | McGarry ............... B60T 8/1705 |
| | | 318/52 |

(Continued)

FOREIGN PATENT DOCUMENTS

| EP | 2648949 A1 | 6/2011 |
| EP | 2918459 A1 * | 9/2015 ............ B60T 17/228 |

(Continued)

OTHER PUBLICATIONS

International Search Report and Written Opinion for corresponding Application No. PCT/IB2018/060169 dated Mar. 22, 2019.

*Primary Examiner* — Thomas E Worden
*Assistant Examiner* — Daniel Tyler Reich
(74) *Attorney, Agent, or Firm* — THE SMALL PATENT LAW GROUP LLC; Philip S. Hof

(57) ABSTRACT

A braking control system includes braking control modules configured to generate a braking torque request signal, indicative of a requested braking torque value CFr, which is variable until reaching a target value Vt, and to supply the braking torque request signal to a braking means which converts it into a braking torque with effective braking torque value CFe. The braking control modules are configured to calculate a total difference of instantaneous braking torque ΔCFt as the sum of the differences between the CFr values and the CFe values of all modules. If the calculated ΔCFt is greater than zero when Vt is reached, the braking control modules increase the braking torque until a ΔCFt subsequent to reaching Vt has a zero or negative value, or until the maximum available adhesion signal has indicated (Continued)

that a controlled axle has reached the maximum available adhesion.

20 Claims, 7 Drawing Sheets

(52) U.S. Cl.
CPC ......... *B60T 13/662* (2013.01); *B60T 2210/12* (2013.01); *B60T 2270/60* (2013.01)

(58) Field of Classification Search
CPC .... B60T 2270/60; B60T 2240/06; B60T 8/17; Y02T 10/72
See application file for complete search history.

(56) References Cited

U.S. PATENT DOCUMENTS

| | | | |
|---|---|---|---|
| 2007/0096548 A1* | 5/2007 | Anstey | B60T 13/66 303/7 |
| 2013/0338860 A1* | 12/2013 | Herden | B60T 8/1705 701/20 |
| 2018/0186351 A1 | 7/2018 | Chen et al. | |

FOREIGN PATENT DOCUMENTS

| | | | |
|---|---|---|---|
| GB | 2402983 | A | 6/2003 |
| WO | 2004058480 | A1 | 7/2004 |
| WO | 2012052381 | A1 | 4/2012 |
| WO | 2017005112 | A1 | 1/2017 |
| WO | 2017109690 | A1 | 6/2017 |
| WO | 2017175108 | A1 | 10/2017 |

\* cited by examiner

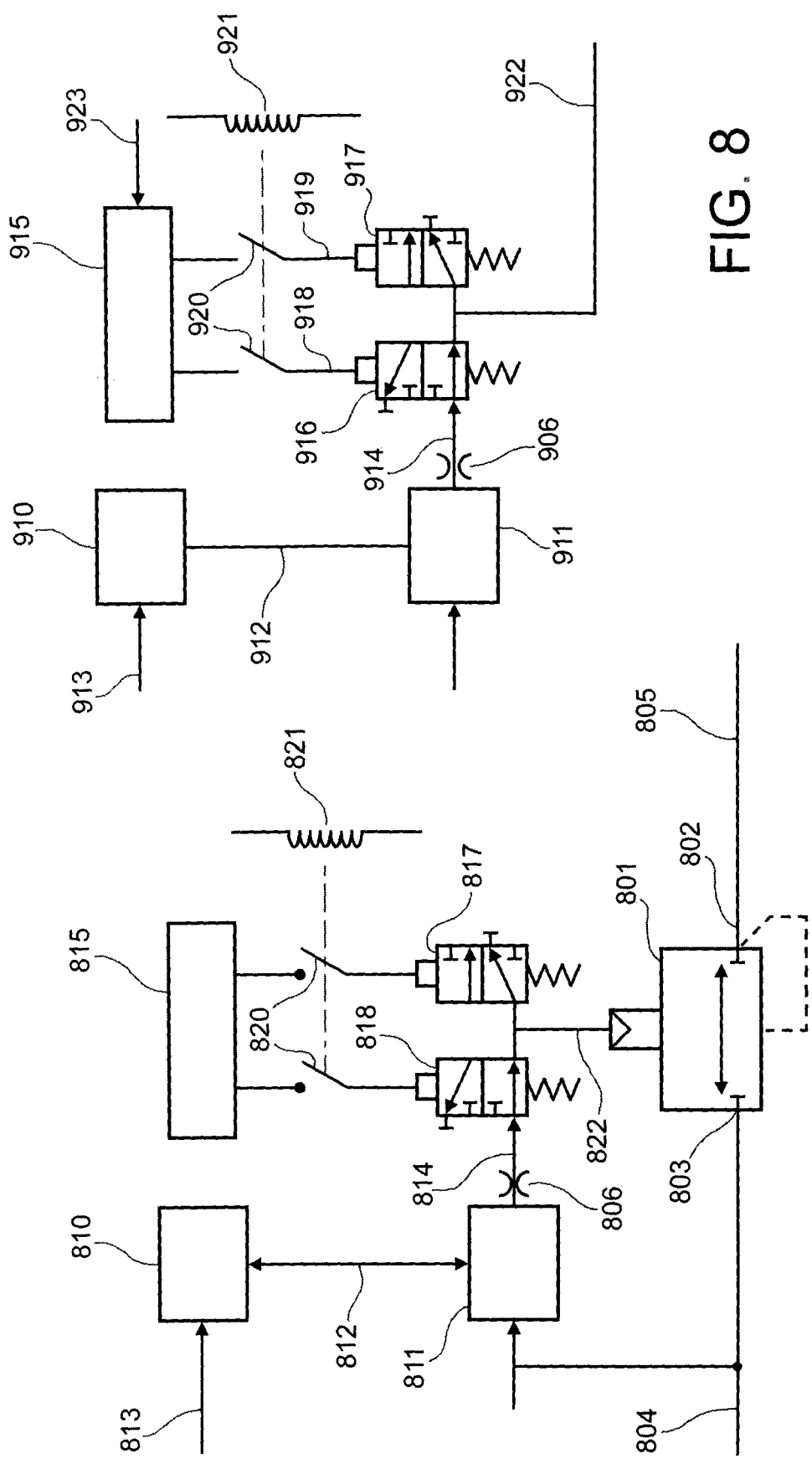

VEHICLE BRAKING CONTROL SYSTEM

CROSS-REFERENCE TO RELATED APPLICATIONS

This application is a national stage entry of PCT/IB/2018/060169, which was filed on Dec. 17, 2018 and claims priority to IT 201700145810, filed Dec. 18, 2017. Both applications are incorporated by reference in their entirety.

FIELD

Embodiments of the inventive subject matter relate to braking of a railway vehicle, in particular in the event of a degraded adhesion condition or in the event of degraded operation of the braking system.

BACKGROUND

FIG. 1 illustrates a possible, but not exclusive, architecture of a state-of-the-art railway braking system. A railway braking system produces a braking torque CF 100 applied to an axle 101 which is bound to two wheels 102. The braking torque CF 100 is generated by a pneumatic pressure 105 applied to one or more braking cylinders 103 acting via friction means 133 directly on the wheels 102 or on one or more discs, not shown in the figures, mechanically connected to the axle 101. The friction means 133 may be a brake shoe that includes a brake pad that is selectively pressed into physical contact with the wheel 102. The brake pad may be useful to slow or stop a vehicle via friction. The brake shoe may have a backing plate that holds the brake pad, and the backing plate may be coupled to the braking cylinder 103 to control the movement of the brake pad into and out of engagement with the wheel 102.

Moreover, said braking torque CF 100 may be generated by a regenerative braking system, also known as an electrodynamic braking system, by using an electric motor 104 connected directly or through gear reduction systems to said axle 101. The braking pressure 105 is generated by an electropneumatic module EP-Module 106 controlled by an electronic unit BCU 107. Said electropneumatic module 106 consists of solenoid valves, pneumatic valves and pressure transducers according to electropneumatic diagrams that are part of the prior art known to persons skilled in the art.

Said electronic unit BCU 107 controls the electropneumatic module 106 to obtain a braking pressure corresponding to a force derived from a deceleration request 110 and from a weight value 111. The weight value corresponds to the weight on the bogie, as one control per bogie, or to the weight of the vehicle, as one control per vehicle. The motor 104 is controlled by a Traction Control module 108 in such a way as to produce a braking torque derived from the deceleration request 110 and the weight value 111.

The friction and electrodynamic braking contributions may be applied according to a variable percentage composition of the two forces over time, according to a method known in the railway world as "blended" braking. The percentage proportions of blending may be mapped a priori in the memory of the electronic unit BCU 107 and of the Traction Control 108 as a function of external variables such as motor regenerative efficiency, vehicle speed, bogie weight or vehicle weight. Those skilled in the art are aware of the existence of other possible, non-exclusive "blended" architectures, such that the percentage proportions of the two friction and electrodynamic braking contributions are calculated in real time by the electronic unit BCU 107, which will directly request an electrodynamic braking torque value from the Traction Control module 108, using signals not shown in the figures.

If, during braking, the braking force relative to the braking torque CF exceeds the available adhesion force value, e.g. yield degraded by rain or leaves or rust on the rail, the wheels 102 will enter a sliding and potential locking condition. In this case, the WSP (Wheel Slide Protection) system 109 will intervene. Such WSP system 109 may detect any decrease in the speed of the wheels 102 with respect to the speed of the vehicle by means of speed sensors relating to each axle (not shown in the figures). In case of variations above a predetermined threshold, the WSP 109 may modulate the pressure 105 to the brake cylinders 103 by energizing/de-energizing the solenoid valves 113 according to control algorithms that are part of the prior art known to those skilled in the art, so as to avoid the locking of the wheels and to maintain them in a controlled sliding condition that minimizes the loss of grip. A pressure transducer 114 converts the pressure value downstream of the valves 113 into an electrical signal 115 supplied to the BCU 107, giving continuous information on the actual pressure value applied to the braking cylinders 103.

Similarly, WSP software modules integrated into the Traction Control module 108 provide for modulating the braking torque produced by the motor 104 to prevent wheel locking and to maintain the wheels in a controlled sliding condition that minimizes loss of adhesion. The slide control actions of the WSP 109 and the WSP software module integrated in the Traction Control module 108 are synchronized with each other according to strategies known to those skilled in the art, through an exchange of signals between the two WSPs, said signals not being illustrated in the figures.

The BCU 107 and Traction Control 108 modules communicate with other BCU and Traction Control modules in the train via a communication network 116.

It is a known physical fact that during sliding, the wheels 102 inject mechanical and thermal energy into the contact point 112, in a quantity directly, not linearly, linked to the amount of sliding. Such energy partially cleans the contact point 112, improving the adhesion value left to the subsequent wheels at the passage of the wheels 102.

FIG. 9 shows a railway train composed of a plurality of vehicles, braking in degraded adhesion conditions. The adhesion required to decelerate the train according to a given deceleration request is $\mu_n$. The initial degraded adhesion encountered by the vehicle is $\mu_i < \mu_n$. For the sake of simplicity, for example, it is assumed that the weight on all the wheels is uniform, and thus all the wheels are subjected to the same braking torque, as a consequence of the common deceleration request.

The wheel 1 starts a sliding phase which is controlled by the WSP systems by locally reducing the braking torque. Said controlled sliding carries out a partial cleaning in order to increase the adhesion to the level $\mu_2$. The sliding phenomenon and resulting cleaning occurs in a similar way for all the subsequent wheels that encounter a value $\mu < \mu_n$, and thus for the wheels 2, . . . , 6, which will improve the adhesion "released" up to the final value $\mu_f > \mu_n$. At this point, the braking torque applied to the wheel 7 and to the subsequent wheels is not such as to initiate further sliding phenomena.

In the prior art, no further action is taken by the braking systems, other than that described, i.e., protecting the wheels by locally limiting the braking torques through the coordinated actions of the WSP sub-systems. It is evident that due to the local limitations of the braking torques implemented by the WSP sub-systems, the stopping distances increase as a function of the degradation of the initial adhesion $\mu_r$. As is known to those skilled in the art, during braking, even in the case that sufficient adhesion is available to avoid sliding, a phenomenon of micro-sliding is always active on the point of contact between the wheel and the rail, which continues to improve the available adhesion value within certain limits, as illustrated purely by way of example in FIG. 9. Thus, by increasing the braking torque beyond the value initially calculated on the wheels at the end of the train, it is possible to partially or totally compensate for the loss of adhesion that has occurred on the front wheels, partially or totally recovering the deceleration initially requested, and thus the relative braking distance.

For example, patents EP2648949 and WO2012052381 claim a method for recovering adhesion, in the case of degraded adhesion that tends to raise pressures above the requested value where the available adhesion allows it. Such method being implemented by a centralized system requiring a centralized coordination unit to redistribute the braking force along the train of vehicles. The solutions claimed in EP2648949 and WO2012052381, however, disadvantageously (i) provide sequential actions to identify which axes may be used for the recovery of adhesion, according to the respective methods described; (ii) necessitate a master device that coordinates the operations of the various modules; and (iii) necessitate reconfiguring the master device for each application according to the number and type of braking modules belonging to the system.

BRIEF DESCRIPTION

One or more embodiments provide a service and emergency braking control system for at least one railway vehicle that allows the deceleration initially lost in case of a degraded adhesion condition to be recovered, and also in case of operation of the braking system in a degraded mode due to possible malfunctions. The inventive subject matter uses a number of functional modules for the control of the braking system, said modules designed to operate independently of each other, each used to control an individual braking torque, said modules using an algorithm that is based on system observations to be able to operate correctly without the need for centralized control, and without the need for procedures for initialization of the method used, possibly during the operational stage, such as, but not limited to, the initialization of tables with values detected by forced actions during operation.

The aforesaid and other objects and advantages are achieved, according to an aspect of the inventive subject matter, by a service and emergency braking control system for at least one railway vehicle having the characteristics defined in the claims.

BRIEF DESCRIPTION OF THE DRAWINGS

Reference is made to the accompanying drawings in which:

FIG. 7 illustrates a second embodiment of a service and emergency braking control system;

FIG. 8 illustrates a third embodiment of a service and emergency braking control system;

DETAILED DESCRIPTION

Figure 1:
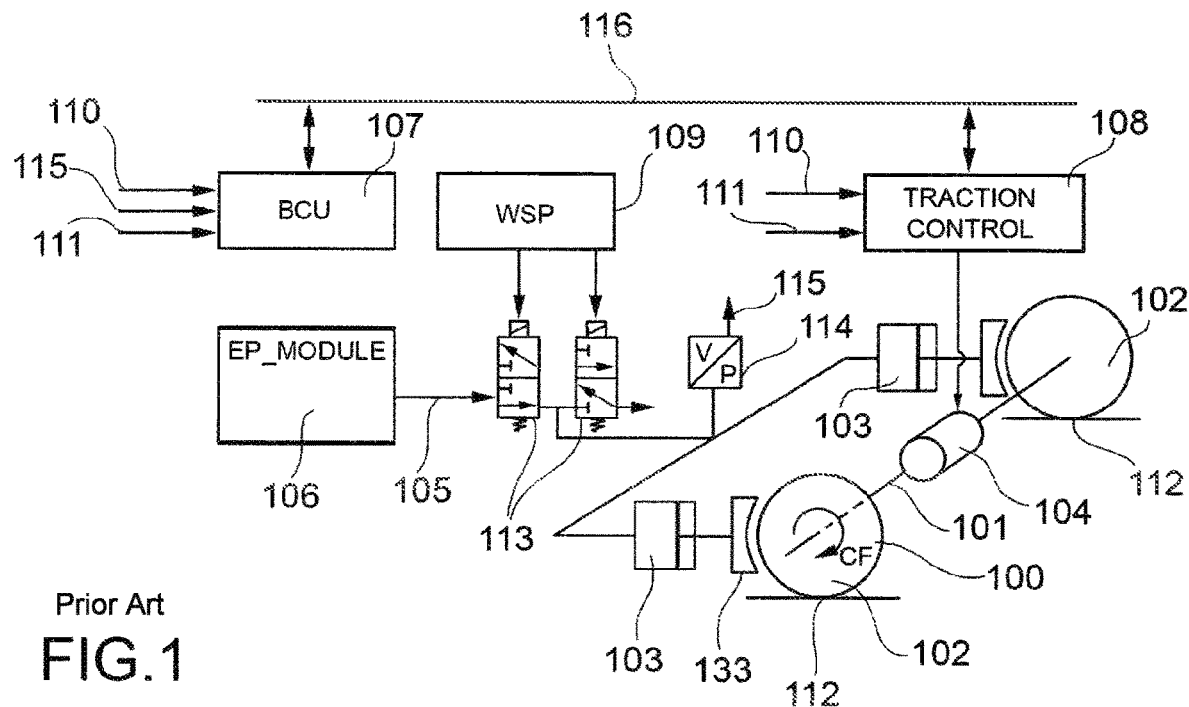
FIG. 1 shows a basic functional diagram of a possible state-of-the-art brake system.

Before explaining a plurality of embodiments of the inventive subject matter in detail, it should be clarified that the inventive subject matter is not limited in its application to the details of construction and to the configuration of the components presented in the following description or illustrated in the drawings. The inventive subject matter may assume other embodiments and may be implemented or achieved in essentially different ways. It should also be understood that the phraseology and terminology have descriptive purposes and should not be construed as limiting. The use of "include" and "comprise" and the variations thereof are to be understood as encompassing the elements stated hereinafter and the equivalents thereof, as well as additional elements and the equivalents thereof.

Furthermore, in the present description, it should be understood that a plurality of connected railway vehicles composes a railway train. Although various embodiments describe railway vehicles, the inventive subject matter described herein is not limited to railway vehicles and can be utilized with other types of vehicles. Other suitable vehicles may include automobiles, trucks, busses, mining vehicles, construction vehicles, and the like. The vehicles, of any of the types listed above, can be mechanically coupled together to move together along a route. For example, a group of connected trucks can represent a road train. Alternatively, the vehicles can be mechanically separate (e.g., not directly or indirectly mechanically coupled to each other) but logically coupled to travel together (e.g., as a convoy). For example, a group of separate vehicles may be communicatively connected to each other through a wireless connection to enable the vehicles to coordinate movement with each other.

Unless otherwise indicated, in the following, reference will be made to braking torque, indicating with this definition a torque produced solely by friction braking force alone, or solely by electrodynamic torque generated by traction motors, or by a composition in variable percentage over time of the two torques.

Figure 2:
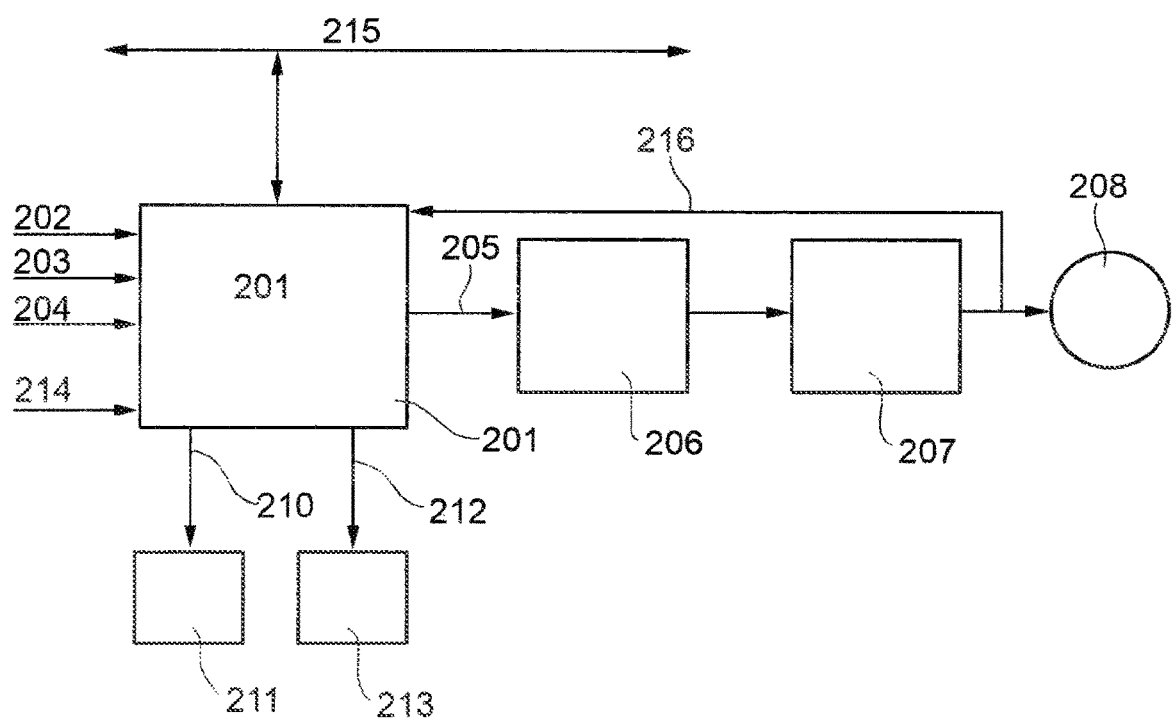
FIG. 2 shows the functional diagram of a system for controlling the braking of an axle according to an embodiment of the present disclosure.

Referring initially to FIG. 2, the functional diagram of a braking control module for an axle according to an embodiment of the present disclosure is illustrated.

In a first embodiment, the system for service and emergency braking control for at least one railway vehicle includes a plurality of braking control modules 201. Each railway vehicle comprises a plurality of axles arranged to be braked by a respective braking torque generated by braking means 207.

Each of these braking control modules 201 controls at least one respective axle of a railway vehicle.

Each braking control module 201 is arranged to receive a deceleration request signal 202 and a signal of achievement of maximum available adhesion 204.

The deceleration request signal 202 is common to all braking modules 201 and is arranged to indicate an objective deceleration value to be reached by the at least one railway vehicle.

The signal of achievement of maximum available adhesion 204 is, on the other hand, intended to indicate the achievement of the maximum available adhesion by at least one axle controlled by said braking control module 201.

Each braking control module 201 is further arranged to generate, independently of any other braking control module 201, a braking torque request signal 205.

Such braking torque request signal 205 is indicative of a braking torque request value, CFr.

The value of the braking torque request signal 205 is variable by the braking control module 201 so as to increase, according to a first torque gradient, the braking torque request value CFr.

The first torque gradient, in a currently preferred embodiment of the inventive subject matter, is the same for all the braking control modules 201 comprised in the braking system. Each braking control module 201 may provide for converting it locally into its own first braking torque gradient according to its own weight signal 203, in such a way that, locally, all braking control modules 201 comprised in the braking system contribute uniformly to the simultaneous achievement of the deceleration request.

The value of the braking torque request signal 205 is variable until it reaches a target value Vt, which is determined by the braking control module 201 as a function of the deceleration request signal 202 and a weight signal 203 indicative of the weight acting on an axle or on a bogie or on a body of the railway vehicle including the axle controlled by said braking control module 201.

Each braking control module 201 is further arranged to provide said braking torque request signal 205 to a braking means 207 associated with a railway vehicle axle controlled by said braking control module 201.

The braking means 207 is arranged to convert the value of the braking torque request signal 205 into a braking torque having an effective braking torque value CFe applied to an axle controlled by said braking control module 201, to decelerate at least one railway vehicle.

For example, the higher the value of the braking torque request signal 205, the higher will be the value of the braking torque generated by the braking means 207, or vice versa.

The braking torque value generated may be calculated according to the deceleration request signal 202 and the weight signal 203 according to the known formula F=m·a and the appropriate Force→Torque conversion.

Said braking means 207 may, for example, be a braking means arranged to provide a friction-type or electrodynamic-type braking force or a combination of braking means arranged to provide friction-type braking force and braking means to provide electrodynamic-type braking force which are managed according to blended strategies. The braking means 207 arranged to provide friction-type braking can include the friction means 133, such as a brake shoe, shown in FIG. 1, and associated components for mechanically controlling the operation of the friction means/brake shoe 133. For example, the friction-type braking means can include the pneumatic braking cylinder 103. The braking means 207 arranged to provide electrodynamic-type braking force can include the traction motor 104 shown in FIG. 1 that is mechanically coupled to the axle 101, and any associated components that link the traction motor 104 to the axle 101. For example, the traction motor 104 in an electrodynamic regenerative brake mode can extract energy from the rotation of the axle 101 as work to generate electric current, which effectively slows the rotation of the axle 101.

Moreover, each braking control module 201 is arranged to transmit to the other braking control modules 201, cyclically at predetermined moments in time spaced apart from each other by a predetermined time interval and through a communication network 215, the instantaneous effective braking torque value CFe of its applied braking torque and its instantaneous requested braking torque value CFr indicated by the braking torque request signal (205). Or, to transmit to the other braking control modules 201, cyclically at predetermined moments in time spaced apart from each other by a predefined time interval and through the communication network 215, a local difference of instantaneous braking torque $\Delta CFl$ obtained through the difference between its own instantaneous requested braking torque value CFr and the instantaneous effective braking torque value CFe of its applied braking torque.

All other braking modules 201 comprised in the braking system will therefore also be connected to such communication network 215.

Moreover, each braking control module 201 receives, cyclically at each of said predetermined moments in time and through said communication network 215, the instantaneous effective braking torque values CFe transmitted by the other braking control modules 201 and the instantaneous requested braking torque values CFr transmitted by the other braking control modules 201. Or, it cyclically receives at each of these predetermined moments in time and through said communication network 215 the local difference of instantaneous braking torque $\Delta CFl$ transmitted by each other braking control module (201).

Each braking control module 201 is further arranged to calculate, cyclically for each of said predetermined moments in time, a total difference of instantaneous braking torque $\Delta CFt$ as the sum of the differences between the instantaneous requested braking torque values CFr and the instantaneous effective braking torque values CFe of all the braking control modules 201. Or, to calculate cyclically for each of said predetermined moments of time, the sum of the local differences of instantaneous braking torque $\Delta CFl$ of all braking control modules 201.

If, when the braking torque request signal 205 reaches said target value Vt, the calculated total difference of instantaneous braking torque $\Delta CFt$ is greater than zero, the braking control module 201 varies the braking torque request signal 205 so as to increase the applied braking torque converted by the braking means 207.

The calculated total difference of instantaneous braking torque $\Delta CFt$, which is verified to be greater than zero when the braking torque request signal 205 reaches the target value Vt, may be the difference calculated at exactly the moment wherein the braking torque request signal 205 reaches said target value Vt, or, may be the difference calculated in the first of the said moments of time that follows the achievement of said target value Vt by the braking torque request signal 205, or, may be the difference calculated in the last of said moments of time that precedes the achievement of said target value Vt by the braking torque request signal 205.

The value of the braking torque request signal 205 is varied until the value of a calculated total difference of instantaneous braking torque ΔCFt in one of said predetermined moments in time, following the achievement of said target value Vt by the braking torque request signal 205, reaches a zero or negative value, or until the maximum available adhesion signal 204 indicates the achievement of the maximum available adhesion by an axle controlled by said braking control module 201.

The braking torque applied is increased in accordance with a second predetermined torque gradient.

The second gradient is not necessarily the same as the first gradient. Similarly to the first gradient, in a currently preferred embodiment, the second gradient is the same for all the braking control modules 201 comprised in the braking system. Each braking control module 201 transforms it locally into its own second braking torque gradient depending on the weight signal 203.

For example, the step of calculating cyclically the total difference of braking torque ΔCFt, when the braking control module 201 receives the instantaneous effective braking torque values CFe of the other braking control modules (201) and the instantaneous requested braking torque values CFr of the other braking control modules (201), is obtained by the following equation:

$$\Delta CFt = \sum_{i=0}^{n} (CFr_i - CFe_i) \quad (1.1)$$

where n indicates the total number of braking control modules 201.

By analyzing the aforesaid formula in detail:
$CFr_i$=instantaneous requested braking torque value of the i-th braking control module;
$CFe_i$=instantaneous effective braking torque value of the i-th braking control module; and
$(CFr_i-CFe_i)$ corresponds to the braking torque that may, for example, have been removed at the i-th axle by an i-th WSP module 206.

When, on the other hand, the braking control module 201 directly receives the local difference of braking torque ΔCFl of each other braking control module (201), the step of cyclically calculating the total difference in braking torque ΔCFt may be obtained by the following equation:

$$\Delta CFt = \sum_{i=0}^{n} \Delta CFl_i \quad (1.2)$$

where n indicates again the total number of braking control modules (201) and $\Delta CFl_i$, indicates the local difference in braking torque of the i-th braking control module.

In a variant with respect to the embodiment described above, the local difference of instantaneous braking torque ΔCFl may instead be obtained by the difference between the instantaneous effective braking torque value CFe of its applied braking torque and its instantaneous requested braking torque value CFr, and the total difference of instantaneous braking torque ΔCFt may be calculated as the sum of the differences between the instantaneous effective braking torque values CFe and the instantaneous requested braking torque values CFr of all braking control modules 201, i.e., the sum of the local differences of instantaneous braking torque ΔCFl of all the braking control modules 201 obtained as just described above. In such case, therefore, it is necessary to check whether, when the braking torque request signal 205 reaches this target value Vt, the calculated total difference of instantaneous braking torque ΔCFt is less than zero. The value of the braking torque request signal 205 will thus vary until a calculated total difference of instantaneous braking torque ΔCFt in one of said predetermined moments in time following the achievement of said target value Vt by the braking torque request signal 205 reaches a zero or positive value, or, as above, until the maximum available adhesion signal 204 indicates the achievement of the maximum available adhesion by an axle controlled by said braking control module 201.

In this variant, the formula used to calculate the total difference in braking torque ΔCFt could instead be:

$$\Delta CFt = \sum_{i=0}^{n} (CFe_i - CFr_i) \quad (2.1)$$

In both embodiments described above, the predefined time interval between the predetermined moments in time when the values are transmitted and received via the communication network 215 may be, for example, but not exclusively, 100 ms. The calculation by the braking control module 201 of a total difference of braking torque ΔCFt may also be carried out every 100 ms, for example.

The transmission method used may be, for example, but not exclusively, the broadcast transmission method.

For convenience, the definition of "maximum available adhesion achieved" will now be abbreviated to MAAA. MAAA=0 means that when the braking control module 201 is not fully using the adhesion available to the wheels of the axle thereby controlled, and MAAA=1 means that when the wheels of the axle controlled by the module 201 have exceeded the maximum available adhesion. Clearly, these values are given purely by way of example and different values may still be used. The MAAA signal 204 may be generated, for example, but not exclusively, by a WSP module 206 when the latter detects a sliding between the wheels relative to the axle controlled by the braking control module 201 and the rail, greater than a predefined value. The MAAA signal 204 may, moreover, be generated, for example but not exclusively, by an algorithm based on an "adhesion observer" as described in WO2017175108, which claims priority to Italian patent application no. 102016000034535, "Procedure for the control and possible recovery of the adhesion of the wheels of controlled axles of a railway vehicle" by FAIVELEY TRANSPORT ITALIA S.p.A, which is incorporated by reference herein.

In a second embodiment of the service and emergency braking control system for at least one railway vehicle, the braking torque request signal 205, before being supplied to the braking means 207, is modulated by a WSP module 206 if the wheels 208 of the at least one axle controlled by said braking control module 201 begin to slide.

Said WSP module 206 may be a system comprising at least one means for performing a modulation, according to determined algorithms, of the friction-type braking force or a software module for the electrodynamic-type modulation of the braking force. In a further possibility, the WSP module 206 may comprise both a friction-type braking force modulation system and a software module for the electrodynamic-type braking force modulation. The above corresponds to the composition of the braking means 207. In the present description, the term "software module" means one or more software instructions comprised in a computer program that are adapted to be executed, for example by a microprocessor, to achieve a predetermined function or algorithm.

The value of the braking torque effectively applied by the braking means 207 will correspond to the torque value indicated by the braking torque request signal 205, if the WSP module 206 is not intervening, and the value of the braking torque effectively applied by the braking means 207 will be lower than the torque value indicated by the braking torque request signal 205, if the WSP module 206 is intervening due to the sliding of the wheel 208.

Given the composition of the braking means 207, the signals 216 output from the WSP module 206 may consist, for example, but not exclusively, of a pneumatic pressure value taken upstream of the brake cylinder, suitably converted into torque value by appropriate algorithms executed in the braking module 201, or by current values measured on the electric motor developing the electrodynamic braking force, said current values being subsequently converted into braking torque values by appropriate algorithms executed in the braking module 201, or by both said values if the braking means 207 consists of both braking modes.

The value of the deceleration request signal 202 may also directly indicate a braking torque request value. In this case, the braking control module 201 may use the formula a=F/m to determine the objective deceleration value. Additionally, the value of the deceleration request signal 202 may directly indicate a pneumatic braking pressure request value if the braking means 207 is a means for providing friction-type braking force.

The aforesaid ΔCFt value, in other words, is intended to allow the determination of how much braking torque is not applied to the railway train composed of railway vehicles, for example due to joint actions of one or more WSP modules 206 of the braking system.

ΔCFt=0 therefore corresponds to a condition wherein all the requested braking torque corresponds to the effective braking torque.

For example, a condition of perfect adhesion, where no WSP 206 is intervening on the train.

Figure 3:
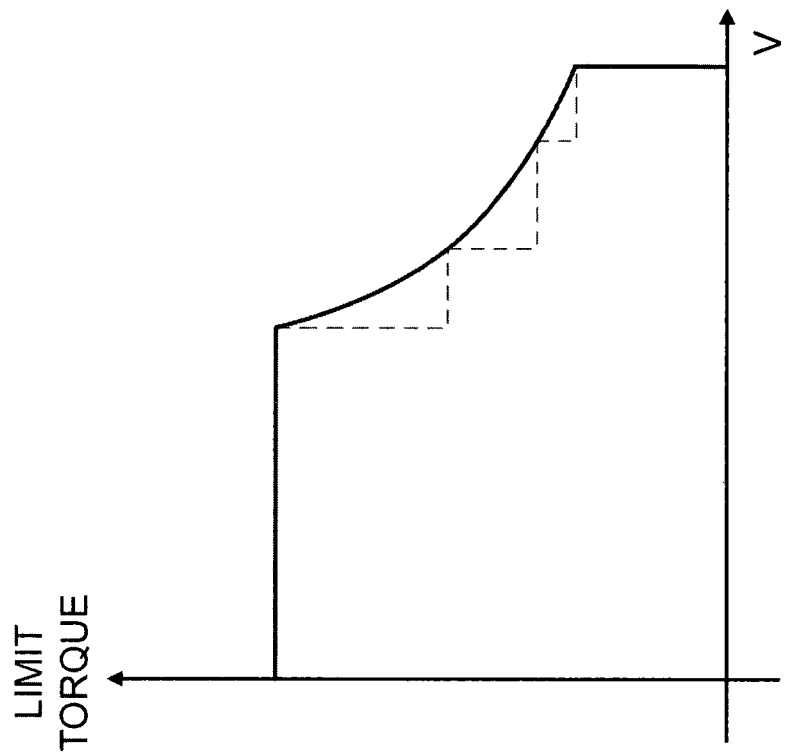
FIG. 3 illustrates the functional criteria of a single braking control module according to an embodiment of the present disclosure.

Referring now to FIG. 3, an example case is illustrated wherein it is supposed that said deceleration request requires an available adhesion μ=A. If the available adhesion is lower, for example represented by the curve μ1, the axle controlled by the braking control module 201 starts to slide as soon as the peak P1 is exceeded, the input MAAA 204 immediately assumes the value MAAA=1, the braking control module 201 however continues to increase the requested braking torque up to the value corresponding to line A, i.e. until the braking torque, previously calculated, corresponding to the value of the deceleration request signal 202 and to its own weight signal 203, is fully applied. It is the task of the WSP module 206 to limit the braking torque requested by the braking torque request signal 205 in order to maintain the sliding of the wheels 208 at a controlled speed value, cleaning the rail partially or totally if necessary and increasing adhesion for the subsequent wheels.

The reason for this strategy is to force the rail cleaning action performed by the WSP module. Another reason is not to limit a braking torque request that may correspond to an emergency braking request. If the available adhesion is greater than line A, for example represented by the curve μ2, the input MAAA 204 maintains the value MAAA=0, thus indicating that the maximum available adhesion has not yet been achieved, or that there is still room to increase the braking torque. Said margin corresponds to the distance from the line μ=A and the point P2. The braking control module 201 then observes the ΔCFt value thereby periodically calculated, for example, according to the formula 1.1 described above.

If, when the braking torque request signal 205 reaches said target value Vt, the calculated total difference of instantaneous braking torque ΔCFt is greater than zero, the braking control module 201 varies the braking torque request signal 205 so as to increase the applied braking torque converted by the braking means 207.

The value of the braking torque request signal 205 is varied until the value of a calculated total difference of instantaneous braking torque ΔCFt in one of said predetermined moments in time following the achievement of said target value Vt by the braking torque request signal 205 reaches a zero or negative value, or until the maximum available adhesion signal 204 indicates the achievement of the maximum available adhesion by an axle controlled by said braking control module 201.

Thus, if the available adhesion corresponds for example to the curve μ2, if, during the additional increase in braking torque, the said adhesion curve μ2 is exceeded, a sliding phenomenon at the controlled axle 208 starts, the input 204 assumes the value MAAA=1, and the braking control module 201 reduces the braking torque value by a predetermined stored value. Said predetermined value may be zero or such as to reduce the braking torque value continuously until the condition MAAA=0 is achieved. The predetermined value, being in any case such as not to allow the applied braking torque value to be lower than the braking torque value initially requested by means of the deceleration request signal 202, corresponding to the straight line μ=A.

Figure 4:
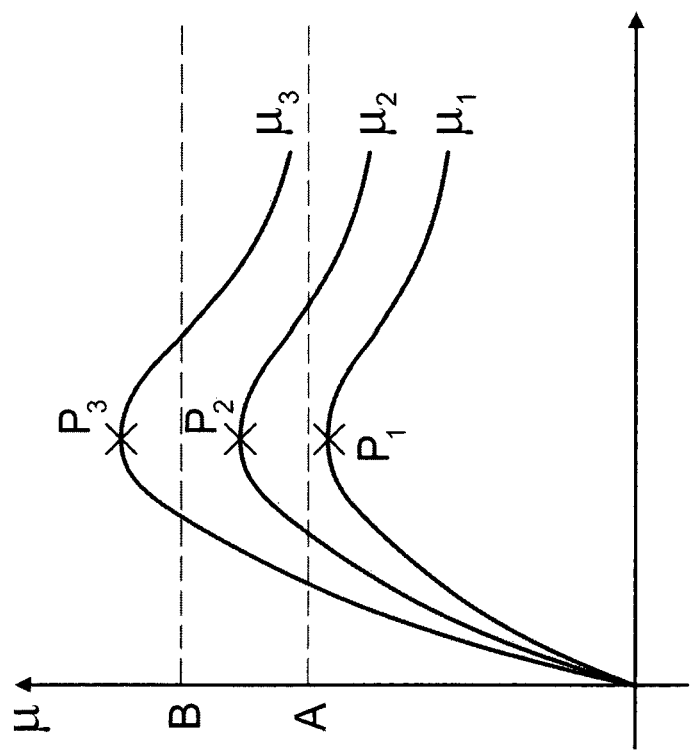
FIG. 4 shows the behavior curve of the braking torque limit as a function of the speed of the railway vehicle.

In a further embodiment, a braking torque limit value corresponding, in FIG. 3, to the adhesion value μ=B may be stored inside the braking control module 201. Said braking torque limit value being necessary to avoid an excessive increase in braking torque, made possible by any available adhesion μ3. Excessive increases in braking torque may cause mechanical damage or high temperatures in the braking members. Those skilled in the art know that adhesion at the point of contact between the wheel and rail decreases as the speed of the vehicle increases. In order to avoid triggering sliding due to an excessive increase in braking torque beyond the nominal limits, said braking torque limit value may be a function of speed, as well as weight, as qualitatively illustrated in FIG. 4. Said function may have a continuous characteristic (continuous line) or with one or more steps (dotted line).

The above information refers to a "per-axle" torque control.

Figure 10:
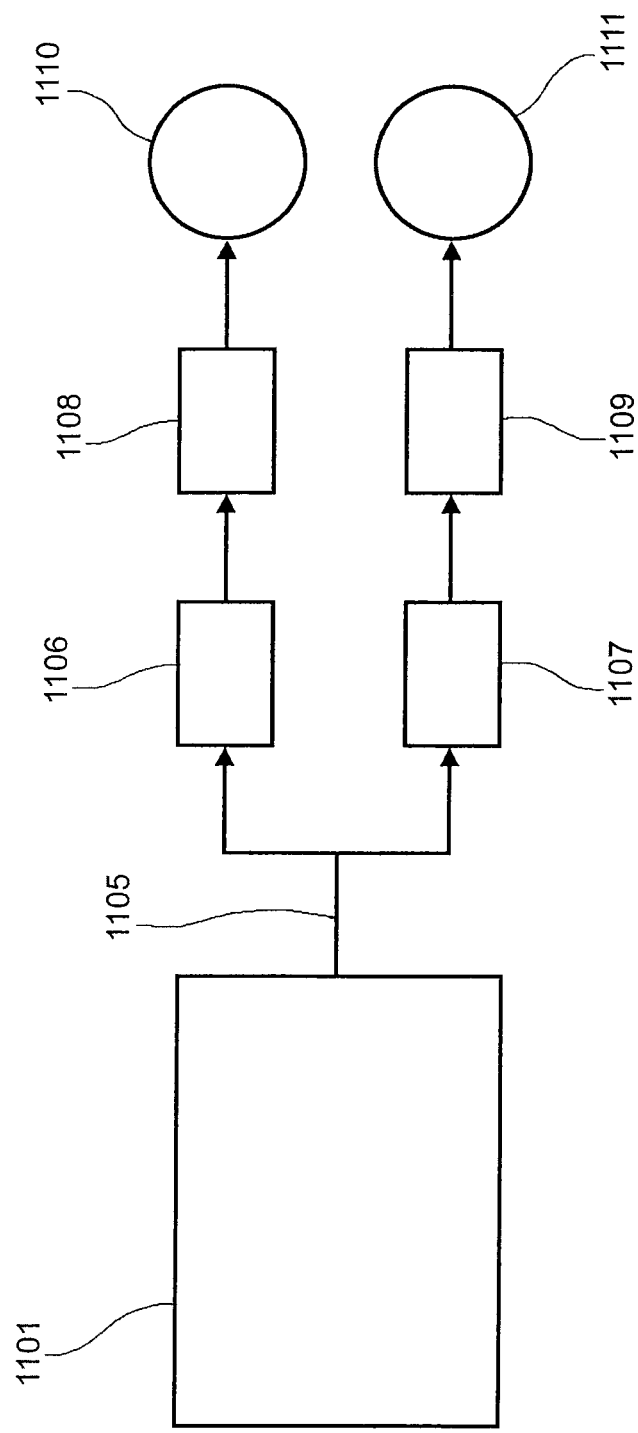
FIG. 10 illustrates the functional diagram of a system for the braking control of a two-axle bogie according to an embodiment of the present disclosure.

FIG. 10 shows a control configuration "per bogie": the braking control module 1101 generates a braking torque request 1105 which is sent in parallel to braking torque generation modules 1108 and 1109 associated with the two axles represented by the wheels 1110 and 1111. To each axle is associated a WSP module 1106 and 1107, each WSP function used in controlling the sliding of the respective axes 1110 and 1111.

Also in this case, as described previously, the WSP modules 1106 and 1107 may be a system or a software module, or may be both a system and a software module.

In the configuration described in FIG. 10, the braking control module 1101 receives the same signals as those received by the braking control module 201 described previously.

Moreover, the braking control module 1101 continues to follow the procedure described previously and implemented by the braking control module 201 in FIG. 2. In the configuration described in FIG. 10, the MAAA signal assumes, for example, the value MAAA=0 when both axles corresponding to the wheels 1110 and 1111 are not in the sliding phase and assumes the value MAAA=1 when at least one of the axles corresponding to the wheels 1110 and 1111 is in the sliding phase.

As described above, a braking control module 201 or 1101 may be completely autonomous in deciding which actions to take.

Figure 5:
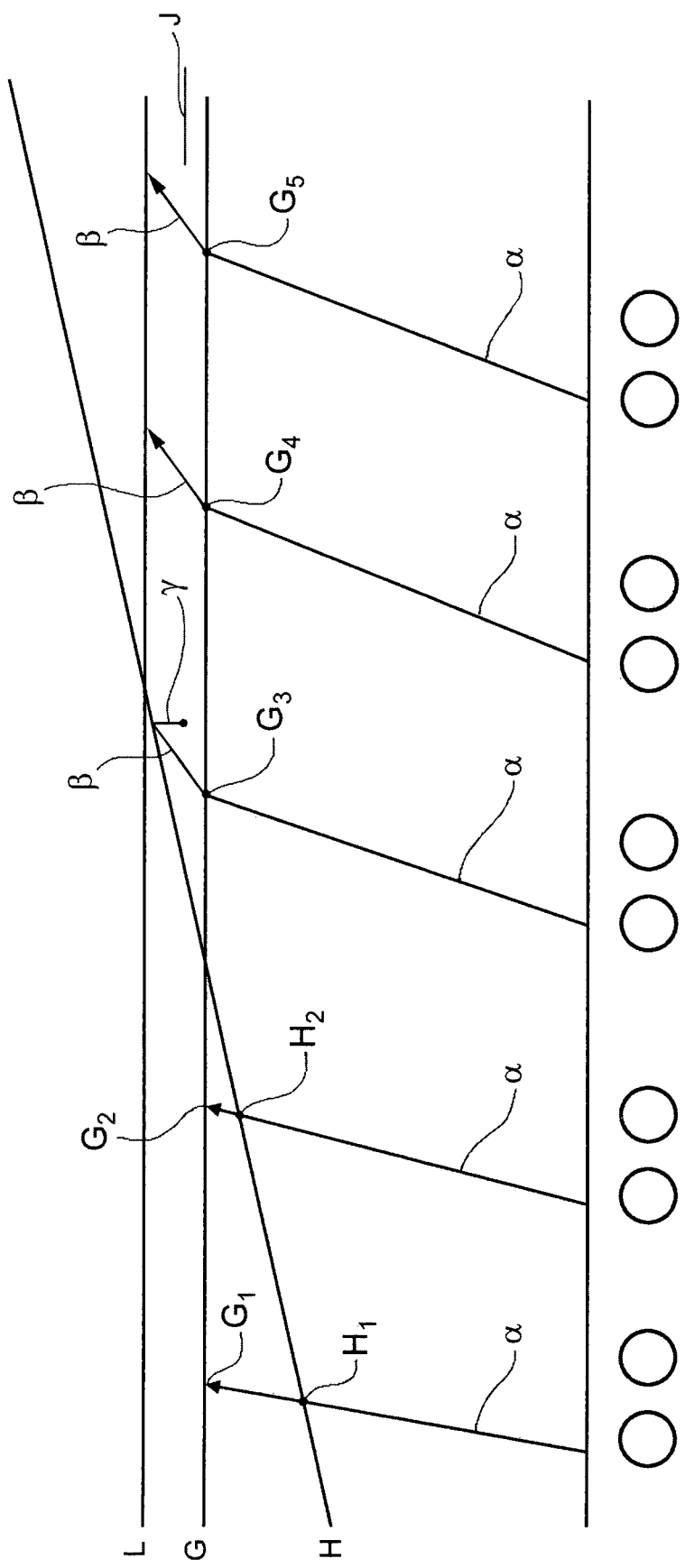
FIG. 5 illustrates, by way of example, the behavior of the braking control system for at least one railway vehicle made in accordance with an embodiment in the event of degraded adhesion.
Figure 9:
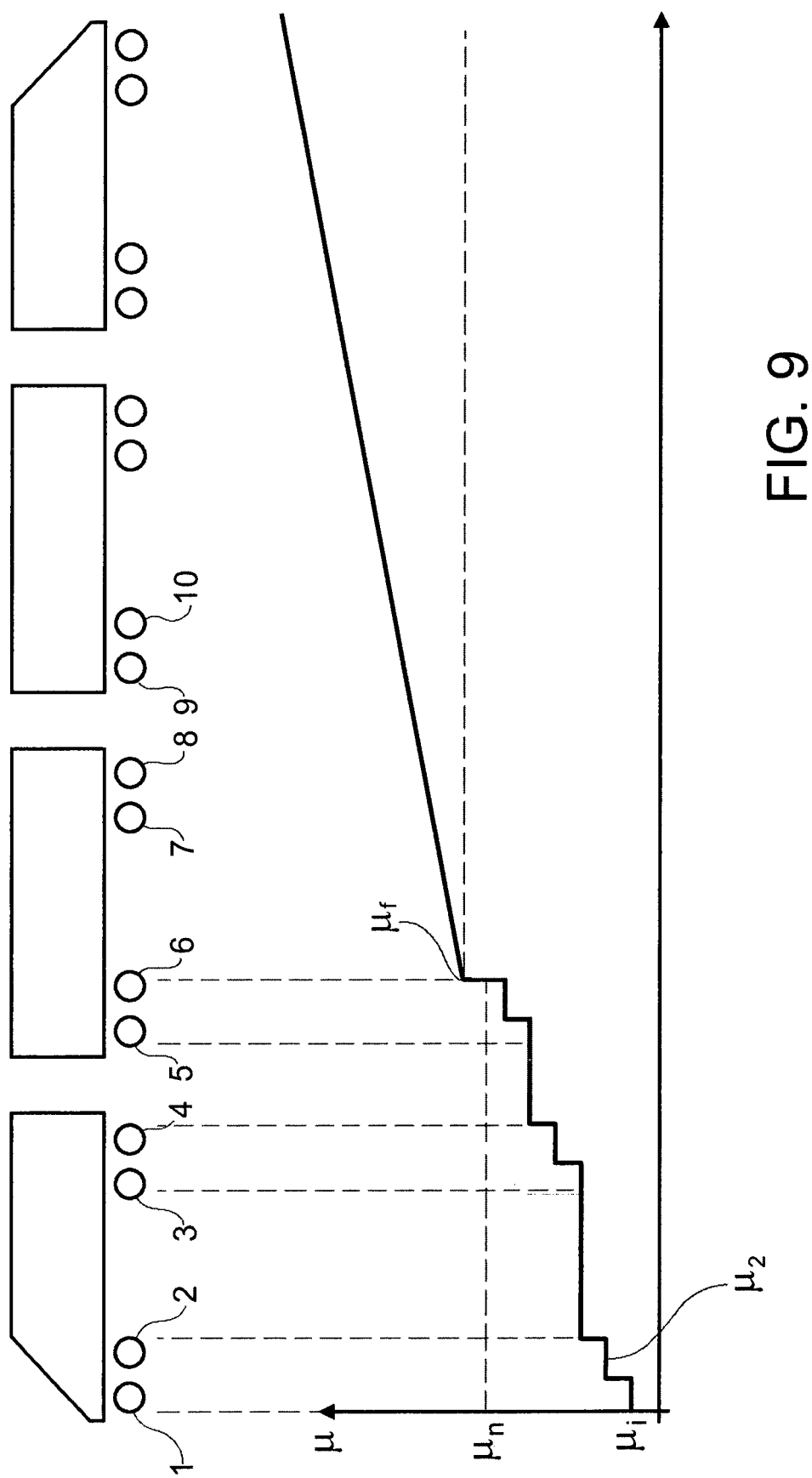
FIG. 9 shows the behavior of a railway train in case of degraded adhesion according to the state of the art.

FIG. 5 illustrates the case of operation of the aforesaid system in the event of degraded adhesion. Line G represents the braking torque required to achieve the requested nominal deceleration, and line H qualitatively represents the braking torque corresponding to the maximum available adhesion. The inclination of line H represents the cleaning phenomenon of the rail, approximating, by way of example, the steps of increase of µ illustrated in FIG. 9. It is known to those skilled in the art of railways that in reality what is represented by line H may occur in nature in the form of curves of which line H is a good approximation, and in any case sufficient for the present demonstration. At the deceleration request, all braking control modules 1101 will apply the braking torque G according to a first common gradient α. The axles corresponding to the first and second bogies will start to slide when the braking torque value applied to them reaches points H1 and H2, respectively, on line H. The MAAA input signals to the modules relating to the first and second bogies will assume an MAAA=1 state due to the occurrence of sliding. The braking control modules 1101 relative to the first and second bogies will in any case increase the braking torque value, reaching line G, the WSP modules 206 corresponding thereto will limit the braking torque to the bogies, keeping the axles in a controlled sliding condition. As described above, when the braking torque value G is reached, the braking control modules 1101 relating to the first and second bogies, having received an MAAA=1 signal, will permanently maintain the braking torque value G. The remaining braking control modules 1101, when the braking torque value G is achieved, observe that the ΔCFt value achieved is greater than zero, i.e. ΔCFt>0 because the sliding of the first and second bogies prevents them from achieving the braking torque G. At the same time, they will be given an MAAA=0 signal. In this condition, they will start to increase the braking torque with a second gradient β equal to each other, for example, but not exclusively, slower than the first gradient. In the example, the braking torque at the third bogie intersects line H during the increase thereof, starting to slide at least one of the axles of said third bogie. At this point, the corresponding braking control module 1101 receives MAAA=1 and thus, as described previously, reduces the braking torque with a fixed step γ or continuously until it receives an MAAA=0 signal, interrupting the sliding on the axles of the corresponding third bogie, and still obtaining locally the highest possible braking torque. One may decide to assign the value zero to the parameter γ. In this case, the braking torque is not reduced, and a permanent minimum sliding will be imposed, controlled by the relevant WSP module, which will accelerate the cleaning of the rail for the subsequent wheels.

In the example in FIG. 5, only the fourth and fifth bogies may achieve a braking torque value represented by line L so as to cancel ΔCF. If, on the other hand, a braking torque limit value J, with G<J<L corresponding to line B of FIG. 3, has been programmed, the braking control modules 1101 relative to said fourth and fifth bogies suspend the increase in braking torque and the expected deceleration is not achieved. However, the deceleration of the vehicle or the train of vehicles is always best maximized even in the degraded condition.

A variant that improves upon that which is described in FIG. 5, referring for example, but not exclusively, to the braking control module 201, 1101, is represented by the fact that said braking control module 201, 1101, in the presence of an MAAA=1 signal, may activate a possible adhesion recovery means 211 connected thereto by means of a respective control signal 210. The adhesion recovering means 211 may, for example, but not exclusively, comprise one or more electrically connected reservoirs or sandboxes to this braking control module. The reservoir can be filled with a friction-enhancing material adapted to increase the friction coefficient between the wheel and the rail. The adhesion recovering means 211 can include a pump, nozzle, controllable door, and the like for selectively, automatically injecting or releasing the friction-enhancing material from the reservoir onto the rail. The friction-enhancing material can include or represent sand, finely-ground gravel, a ceramic, and/or the like.

For example, said control signal 210 may be a binary signal so as to control the adhesion recovering means 211 in an on/off mode for selectively applying the sand or other friction-enhancing material.

Moreover, again by way of example, the control signal 210 may be a continuous control signal arranged to control the flow of sand or other means for improving adhesion according to a continuous law proportional to the speed of the vehicle 214, or according to a continuous law proportional to the distance between point H associated with said braking control module 201 and line G of FIG. 5, or according to a continuous law proportional to the speed of the vehicle 214 and to the distance between point H associated with said braking control module 201 and line G of FIG. 5.

Each braking control module 201 may also deactivate said adhesion recovering means 211 upon reaching a predetermined sliding value that may be stored in a memory means or a predetermined minimum instantaneous adhesion value that may be stored in such memory means. The memory means may include or represent a tangible and non-transitory computer-readable storage medium. The memory may also store programmed instructions (e.g., software) that is executed by one or more processors in the braking control modules 201 to perform the operations of the braking control modules 201 described herein.

Likewise, said braking control module 201, 1101, in the presence of an MAAA=1 signal, may activate one or more magnetic brake shoe 213 connected thereto by means of an activation and deactivation signal 212 in order to perform a cleaning action of the rail, so as to increase the available adhesion. On the other hand, if there is an MAAA=0 signal, the braking control module 201, 1101 may interrupt the activation of said magnetic brake shoes 213.

Said activation and deactivation signal 212 of the magnetic brake shoes may be sent with a temporal wave hysteresis to avoid possible continuous oscillations of the same control signal, which could damage the magnetic brake shoes 213.

The activation of the adhesion recovery means 211 or the magnetic brake shoes 213 described above is intended to move line H of FIG. 5 to the left. In this case, a greater number of bogies may contribute to recovering the requested deceleration by each using a lower amount of braking torque, possibly avoiding the intersection with the curve µ=B of FIG. 3.

The magnetic brake shoes 213 may be deactivated by the braking control module 201 upon achieving a predetermined minimum sliding value that may be stored in the memory means or upon achieving a predetermined minimum instantaneous adhesion value that may be stored in the memory means.

The braking torque or pneumatic pressure generated by at least one braking means 207 may be interrupted by the braking control module 201 when a predetermined braking torque or pneumatic pressure value is achieved, which may be stored in the memory means.

The following is an illustration of some example embodiments of a service and emergency braking control system.

Figure 6:
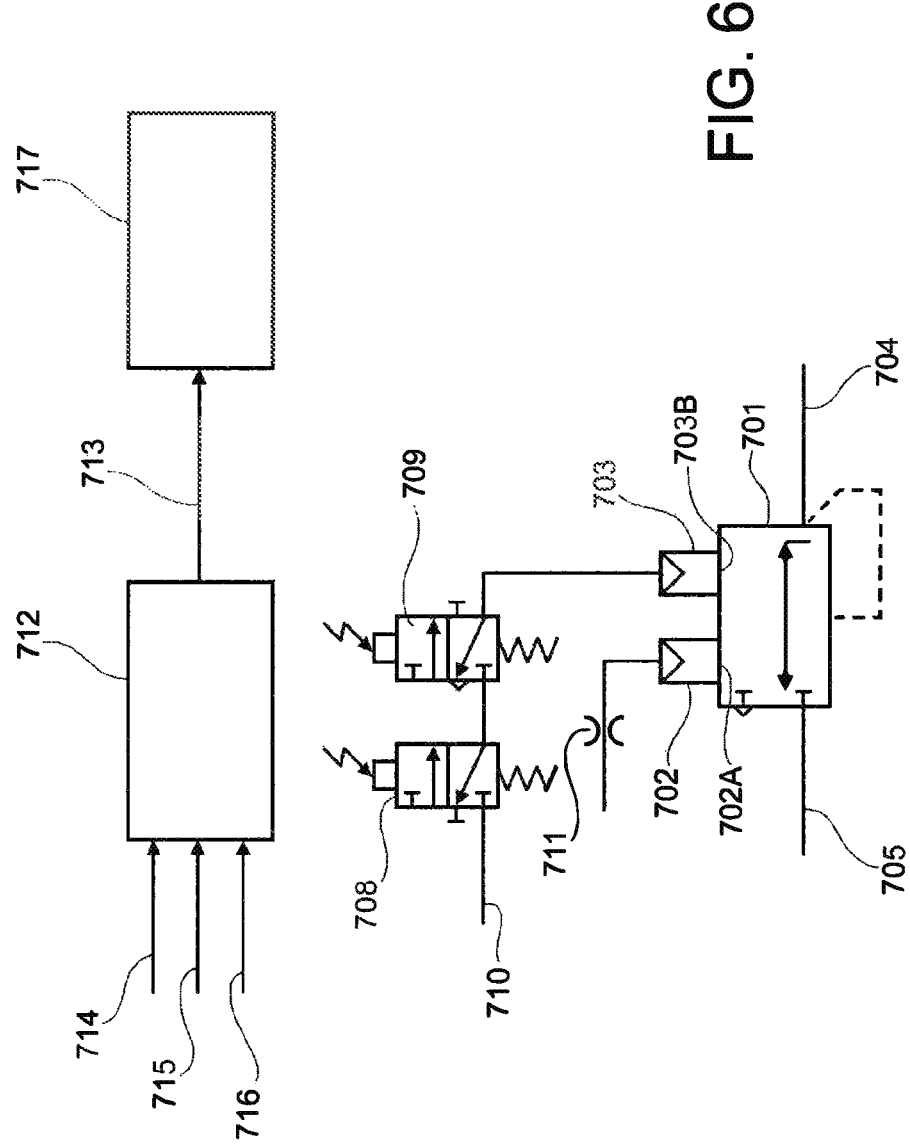
FIG. 6 illustrates an embodiment by way of example of a service and emergency braking control system.

In a first embodiment illustrated in FIG. 6, the braking control system is an electropneumatic system.

Such system comprises a pneumatic relay valve 701, which may be controlled by two pilot chambers 702 and 703. On the input 705 of said relay valve 701, a pneumatic supply may be provided coming from reservoirs (not shown in FIG. 6). The supply may be provided at a higher pressure than that requested by the users connected to the output 704.

Said users may be one or more braking cylinders relating to an axle, or to a bogie, or to a vehicle (said cylinders are not shown in FIG. 6).

The valves 113, controlled by the WSP modules 104, may be interposed between the output 704 of the relay valve 701 and the brake cylinders. The valve 701 may return to its output 704 the pressure value corresponding to the highest value among those present at the control inputs 702A and 703B.

The input 702A may be energized by a pressure coming from an emergency request (not shown in FIG. 6).

A calibrated orifice 711 may limit the pressure gradient coming from the value of the emergency braking request signal 202. The input 703B may be energized with a pressure, said service braking, coming from a modulating action performed by a pair of solenoid valves 708 and 709 controlled by the braking control module 201. In general, the braking control module 201 represents hardware circuitry that includes and/or is connected with one or more processors (e.g., one or more microprocessors, integrated circuits, microcontrollers, field programmable gate arrays, etc.). The braking control module 201 in the illustrated embodiment includes or represents a microprocessor system 712. The modulating action is known to those skilled in the art. In the case of a service brake, the microprocessor system 712 may generate braking torque by acting on valves 708 and 709, causing the pressure to increase, and consequently also the pressure 704 for the pneumatic user.

In the same way, the microprocessor system 712 may generate a braking torque by sending a suitable braking torque request 713 to the traction control system 717, which will control the related motors, not shown. Moreover, the microprocessor system may generate a braking torque as the summation in variable percentages over time of the pneumatic and electrodynamic torques described previously.

During service braking, the microprocessor system 712 may implement the strategies illustrated in FIG. 5, generating a level G in FIG. 5 with gradient α. Subsequently, if the conditions require it, generating a level H of FIG. 5 with a gradient β.

In the case of emergency braking, the microprocessor system 712 may duplicate at the input 703B the instantaneous pressure present at the input 702A.

Said pressure at the input 702A may have a gradient α determined by the orifice 711, until simultaneously reaching level G of FIG. 5.

Subsequently, only the microprocessor system 712 may provide for the further growth of braking torque with gradient β until reaching the line H of FIG. 5.

FIG. 7 illustrates an embodiment, wherein the service and emergency braking control system is an electropneumatic system.

Said electropneumatic system comprises an electronic weighing pressure control module 810 which receives weight information 813 according to which said weighing pressure control module 810 controls an electropneumatic module 811 by means of control signals 812, so that said electropneumatic module 811 generates a pneumatic pressure 814 equal to the emergency braking pressure corresponding to said weight 813.

In this embodiment, the braking control module 201 is an electronic module 815 that may control a filling solenoid valve 816 and an emptying solenoid valve 817 respectively via the control signals 818 and 819.

Said signals 818 and 819 may be interrupted by contacts 820 of a relay energized by an emergency loop 821. Said contacts 820 may be illustrated in the condition of absence of a signal from the emergency loop 821, that is, of an asserted emergency braking request. When the emergency request is not asserted, i.e. the electrical signal from the emergency loop 821 is present, contacts 820 are closed and the electronic module 815 may actively control the filling 816 and emptying 817, 816 valves, producing a pilot pressure 822 proportional to a braking request 823 for an input 803 of the relay valve 801.

Said pilot pressure 822 may assume as maximum value a pressure value 814 equivalent to an emergency braking pressure. The relay valve 801 may receive a supply pressure 804 at its input 803 and may generate a braking pressure 805 at its output 802 for the brake cylinders, not shown in FIG. 7.

Said braking pressure 805 may have a value equal to the value of the pilot pressure 822 but with a flow rate suitable for the volume of the brake cylinders. In the event of an asserted emergency braking request, the signal coming from the emergency loop 821 may be de-energized, contacts 820 may open, and the solenoid valves 816 and 817 may be de-energized assuming the condition illustrated in FIG. 7. Therefore, the emergency braking pressure 814 may be brought back to the input 822 of the relay valve 801 with a gradient established by the calibrated orifice 806. The relay valve 801 may supply a pressure 805, equivalent to the emergency braking pressure 814, at its output 802 to energize the brake cylinders, not shown.

The electronic module 815 may carry out the strategies illustrated in FIG. 5, generating the braking torque up to a level G of FIG. 5 with gradient α.

Subsequently, if a further increase is requested up to line H of FIG. 5, the electronic module 815 may configure the solenoid valves 816 and 817 as illustrated in FIG. 7, that is, in such a way as to bring the emergency braking pressure 814 permanently to the input 822 of the relay valve 801.

The weighing pressure control module 810 may control the module 811 providing for the increase in pressure according to a gradient β. Said pressure is necessary to reach line H of FIG. 5.

During an emergency braking, the signal from the emergency loop 821 may be de-energized, the contacts 820 open, solenoid valves 816 and 817 are de-energized, assuming the condition shown in FIG. 7, whereby the emergency brake pressure 814 may be brought back to the input 822 of the relay valve 801 with a gradient established by the calibrated orifice 806. The orifice is calibrated according to the gradient α.

Subsequently, the electronic weighing pressure control module 810 may control the module 811 providing for an increase in pressure according to a gradient β, said pressure being necessary to reach line H of FIG. 5.

FIG. 8 illustrates an embodiment, wherein the service and emergency braking control system is an electropneumatic system.

Such electropneumatic system comprises an electronic weighing pressure control module 910 which receives weight information 913 according to which said weighing pressure control module 910 may control an electropneumatic module 911 by means of control signals 912. The electropneumatic module 911 may be controlled in such a way that said electropneumatic module 911 generates a pneumatic pressure 914 equal to the emergency braking pressure, corresponding to said weight 913.

In this embodiment, the braking control module 201 is an electronic module 915 that may control a filling solenoid valve 916 and an emptying solenoid valve 917 respectively via the control signals 918 and 919. Said control signals 918 and 919 being interrupted by the contacts 920 of a relay energized by an emergency loop 921.

Said contacts 920 are illustrated in the condition of absence of a signal from the emergency loop 921, that is, an asserted emergency braking request. When the emergency request is not asserted, i.e. the electrical signal from the emergency loop 921 is present, the contacts 920 are closed and the electronic module 915 may actively control the valves 916 and 917, producing a braking pressure 922, proportional to a braking request 923, said braking pressure 922 being sent to the brake cylinders, not shown in FIG. 8. In the event of an asserted emergency braking request, line 921 is de-energized, the contacts 920 open, the solenoid valves 916 and 917 are de-energized, assuming the condition illustrated in FIG. 8, whereby the emergency braking pressure 914 is returned to the brake cylinders with a gradient established by the calibrated orifice 906.

During service braking, the electronic module 915 may carry out the strategies illustrated in FIG. 5, generating the braking torque up to a level G of FIG. 5 with gradient α.

Subsequently, if a further increase is requested up to line H of FIG. 5, the electronic module 915 will configure the solenoid valves 916 and 917 as illustrated in FIG. 8, that is, in such a way as to return the pressure 914 permanently to the brake cylinders.

The weighing pressure control module 910 may control the module 911 providing for the increase in pressure according to a gradient β. Said pressure is necessary to reach line H of FIG. 5. During an emergency braking request, line 921 is de-energized, the contacts 920 open, the solenoid valves 916 and 917 are de-energized assuming the condition shown in FIG. 8, whereby the emergency braking pressure 914 is returned to the brake cylinders with a gradient established by the calibrated orifice 906. Said orifice may be calibrated according to the gradient α. Subsequently, the weighing pressure control module 910 may control the electropneumatic module 911 providing for the increase in pressure according to a gradient β. Said pressure is necessary to reach line H of FIG. 5.

Various aspects and embodiments of a service and emergency braking control system according to embodiments of the present disclosure have been described. It is understood that each embodiment may be combined with any other embodiment. The inventive subject matter, moreover, is not limited to the described embodiments, but may vary within the scope defined by the accompanying claims.

The singular forms "a," "an," and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

Spatial or directional terms, such as "left," "right," "inner," "outer," "above," "below," and the like, relate to the disclosure as shown in the drawing figures and are not to be considered as limiting as the disclosure can assume various alternative orientations.

All numbers and ranges used in the specification and claims are to be understood as being modified in all instances by the term "about." By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or sub-ratios subsumed therein. For example, a stated range or ratio of "1 to 10" should be considered to include any and all subranges or sub-ratios between (and inclusive of) the minimum value of 1 and the maximum value of 10; that is, all subranges or sub-ratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements. The term "at least" is synonymous with "greater than or equal to". The term "not greater than" is synonymous with "less than or equal to." As used herein, "at least one of" is synonymous with "one or more of." For example, the phrase "at least one of A, B, and C" means any one of A, B, or C, or any combination of any two or more of A, B, or C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. The terms "includes," "including," "have," and "having" are synonymous with "comprises."

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values. As used herein, the terms "perpendicular" or "substantially perpendicular" mean a relative angle as between two objects at their real or theoretical intersection is from 85° to 95°, or from 87° to 93°, or from 88° to 92°, or from 89° to 91°, or from 89.5° to 90.5°, or from 89.75° to 90.25°, or from 89.9° to 90.1°, inclusive of the recited values.

What is claimed is:

1. A braking control system comprising:
a plurality of braking control modules communicatively connected to one another and configured to control different respective axles of a vehicle system that includes one or more vehicles, a first braking control module of the braking control modules configured to:
generate a torque request signal including a first requested braking torque (CFr) value for controlling a first braking device operatively connected to a first axle of the axles, the first braking device comprising one or both of a friction brake or an electrodynamic regenerative brake, the first braking device configured to apply a braking torque having a first effective braking torque (CFe) value to the first axle to decelerate the vehicle system, the braking torque being based on the first CFr value;
communicate to other braking control modules of the braking control modules at least one of (i) the first CFr value and the first CFe value or (ii) a first local braking torque difference ($\Delta$CFl) value representing a difference between the first CFr value and the first CFe value;
receive, from the other braking control modules, at least one of (iii) a first set of one or more CFr values associated with other axles of the vehicle system and a second set of one or more CFe values associated with the other axles of the vehicle system, or (iv) a third set of one or more $\Delta$CFl values representing differences between the first set and the second set;
determine a total braking torque difference ($\Delta$CFt) value as one of (v) a difference between (a) a CFr aggregate of the first CFr value and the first set of one or more CFr values and (b) a CFe aggregate of the first CFe value and the second set of one or more CFe values, or (vi) a sum of the first $\Delta$CFl value and the third set of one or more $\Delta$CFl values; and
control the first braking device to modify the braking torque applied to the first axle based on the $\Delta$CFt value.

2. The braking control system of claim 1, wherein the first braking control module is configured to determine the $\Delta$CFt value
as the difference between the CFr aggregate and the CFe aggregate.

3. The braking control system of claim 1, wherein the first braking control module is configured to determine the $\Delta$CFt value as the sum of the first $\Delta$CFl value and the third set of one or more $\Delta$CFl values.

4. The braking control system of claim 1, wherein, in response to determining that the first axle is in a sliding condition relative to a route on which the vehicle system travels, the first braking control module is configured to activate an adhesion recovery device to dispense a friction-enhancing material on the route for adhesion recovery.

5. The braking control system of claim 1, wherein, in response to determining that the first axle is in a sliding condition relative to a route on which the vehicle system travels, the first braking control module is configured to activate a magnetic brake shoe to perform a cleaning action on the route.

6. The braking control system of claim 1, wherein responsive to the $\Delta$CFt value having a first sign, of either positive or negative, representing that the CFr aggregate is greater than the CFe aggregate, the first braking control module is configured to control the first braking device to increase the braking torque applied to the first axle in excess of the first CFe value.

7. The braking control system of claim 6, wherein the first braking control module is configured to control the first braking device to increase the braking torque applied to the first axle until the first braking control module determines (i) that the $\Delta$CFt value is zero or has a second sign opposite the first sign, or (ii) that the first axle is in a sliding condition relative to a route on which the vehicle system travels, whichever occurs first.

8. The braking control system of claim 7, wherein, in response to determining that the first axle is in the sliding condition relative to the route, the first braking control module is configured to control the first braking device to reduce the braking torque applied to the first axle until the first braking control module determines that the first axle is no longer in the sliding condition.

9. The braking control system of claim 1, wherein the first braking control module is configured to generate the first CFr value based on a received deceleration request signal and a received weight signal, the received weight signal associated with the first axle.

10. The braking control system of claim 1, wherein the braking control modules are communicatively connected to one another via a communication network, the first braking control module configured to communicate the at least one of (i) the first CFr value and the first CFe value or (ii) the first $\Delta$CFl value to other braking control modules via the communication network, the first braking control module configured to receive the at least one of (iii) the first set of the one or more CFr values and the second set of the one or more CFe values or (iv) the third set of the one or more $\Delta$CFl values from the other braking control modules via the communication network.

11. The braking control system of claim 1, wherein the vehicle system includes multiple vehicles and the vehicles are railway vehicles.

12. The braking control system of claim 1, wherein the first braking control module is configured to:
associate the $\Delta$CFt value with a first time;
periodically update the $\Delta$CFt value at a predetermined time interval; and
control the first braking device to modify the braking torque applied to the first axle subsequent to the first time based on the $\Delta$CFt value as updated.

13. The braking control system of claim 1, wherein the first braking control module is configured to receive a maximum available adhesion achievement (MAAA) signal that has either a first value or a second value, the first value indicating that one or more wheels connected to the first axle are in a sliding condition attributable to exceeding an available adhesion between the one or more wheels and a route on which the vehicle system travels, the second value indicating that the one or more wheels connected to the first axle are using less than the available adhesion and are not in the sliding condition.

14. The braking control system of claim 1, further comprising a wheel slide protection (WSP) module configured to receive the torque request signal from the first braking control module, the WSP module configured to send a reduced CFr value, that is less than the first CFr value, to the first braking device in response to determining that one or more wheels connected to the first axle are in a sliding condition relative to a route on which the vehicle system travels.

15. A method comprising:
generating a torque request signal including a first requested braking torque (CFr) value for controlling a first braking device operatively connected to a first axle of a vehicle system that includes one or more vehicles, the torque request signal generated by a first braking control module of a plurality of braking control modules configured to control different respective axles of the vehicle system, the first braking device comprising one or both of a friction brake or an electrodynamic regenerative brake;
determining a first effective braking torque (CFe) value of a braking torque applied to the first axle by the first braking device to decelerate the vehicle system;
communicating to other braking control modules of the braking control modules at least one of (i) the first CFr value and the first CFe value or (ii) a first local braking torque difference ($\Delta$CFl) value representing a difference between the first CFr value and the first CFe value;
receiving, from the other braking control modules, at least one of (iii) a first set of one or more CFr values associated with other axles of the vehicle system and a second set of one or more CFe values associated with the other axles of the vehicle system, or (iv) a third set of one or more $\Delta$CFl values representing differences between the first set and the second set;
determining a total braking torque difference ($\Delta$CFt) value as one of (v) a difference between (a) a CFr aggregate of the first CFr value and the first set of one or more CFr values and (b) a CFe aggregate of the first CFe value and the second set of one or more CFe values, or (vi) a sum of the first $\Delta$CFl value and the third set of one or more $\Delta$CFl values; and
controlling the first braking device to modify the braking torque applied to the first axle based on the $\Delta$CFt value.

16. The method of claim 15, wherein controlling the first braking device to modify the braking torque comprises controlling the first braking device to increase the braking torque applied to the first axle in excess of the first CFe value responsive to the $\Delta$CFt value having a first sign indicating that the CFr aggregate is greater than the CFe aggregate.

17. The method of claim 16, wherein the first braking device is controlled to increase the braking torque applied to the first axle until determining (i) that the $\Delta$CFt value is zero or has a second sign opposite the first sign, or (ii) that the first axle is in a sliding condition relative to a route on which the vehicle system travels, whichever occurs first.

18. The method of claim 17, wherein, responsive to determining that the first axle is in the sliding condition relative to the route, the method comprises controlling the first braking device to reduce the braking torque applied to the first axle until determining that the first axle is no longer in the sliding condition.

19. The method of claim 15, further comprising determining that the first axle is in a sliding condition relative to a route on which the vehicle system travels, and, in response to determining that the first axle is in the sliding condition, at least one of (i) activating an adhesion recovery device to dispense a friction-enhancing material on the route, or (ii) activating a magnetic brake shoe to perform a cleaning action on the route.

20. The method of claim 15, further comprising:
associating the $\Delta$CFt value with a first time;
periodically updating the $\Delta$CFt value at a predetermined time interval; and
controlling the first braking device to modify the braking torque applied to the first axle subsequent to the first time based on the $\Delta$CFt value as updated.

* * * * *